United States Patent
Taylor et al.

(10) Patent No.: US 6,328,219 B1
(45) Date of Patent: Dec. 11, 2001

(54) TEMPERATURE-RESPONSIVE MIXING VALVE

(75) Inventors: Gareth P. Taylor, Indian Trail; Ralph T. Teague, Jr., Monroe, both of NC (US)

(73) Assignee: Conbraco Industries, Inc., Matthews, NC (US)

(*) Notice: Subject to any disclaimer, the term of this patent is extended or adjusted under 35 U.S.C. 154(b) by 0 days.

(21) Appl. No.: 09/516,125

(22) Filed: Mar. 1, 2000

(51) Int. Cl.$^7$ .................................................. G05D 23/13
(52) U.S. Cl. ................................ 236/12.2; 236/100
(58) Field of Search ................................ 236/12.2, 93 A, 236/99 K, 100

(56) References Cited

U.S. PATENT DOCUMENTS

| | | | |
|---|---|---|---|
| 2,657,859 | * 11/1953 | Von Wangenheim | 236/12.2 |
| 3,004,710 | * 10/1961 | Couffer, Jr. et al. | 236/12.2 |
| 3,036,777 | * 5/1962 | Budde | 236/12.2 |
| 3,105,375 | * 10/1963 | Eskin et al. | 236/12.2 |
| 3,685,728 | * 8/1972 | Chapou | 236/12.2 |
| 3,765,604 | * 10/1973 | Trubert et al. | 236/100 |
| 3,921,658 | 11/1975 | Botnick . | |
| 4,000,849 | 1/1977 | Wagner et al. . | |
| 4,039,125 | 8/1977 | Botnick . | |
| 4,165,034 | * 8/1979 | Rogers, Jr. et al. | 236/12.2 |
| 4,191,172 | 3/1980 | Walch, Jr. et al. . | |
| 4,285,465 | 8/1981 | North . | |

(List continued on next page.)

OTHER PUBLICATIONS

Caltherm Corporation; Thermal Actuators; brochure; publication date was prior to the date this application was filed; 5 pages; Catalog No. WA0493.

Watts Regulator; Hot Water Extender Tempering Valves; publication date was prior to the date this application was filed; 8 pages; F–N170–M2; U.S.A.

Primary Examiner—William E. Tapolcai
(74) Attorney, Agent, or Firm—Adams, Schwartz & Evans, P.A.

(57) ABSTRACT

A temperature-actuated mixing valve for controlling outlet temperature in a fluid flow system including a valve housing having first and second fluid supply inlets for introducing first and second respective supply fluids and a fluid outlet for dispensing a fluid at a predetermined outflow temperature. The mixing valve includes a shuttle assembly positioned in the housing. The shuttle assembly includes a valve member mounted for movement within the housing responsive to the temperature of the supply fluids to vary the mixture ratio of the first and second supply fluids as required to dispense fluid at the predetermined outflow temperature. A shuttle member is positioned within the valve member and is moveable as a unit therewith within a predetermined range of motion responsive to supply fluid temperature variation. A thermal actuator is provided of the type which converts thermal energy into mechanical movement by movement of a piston. A first end of the thermal element engages the movable shuttle member and an opposing second end engages a stationary portion of the housing whereby movement of the piston of the thermal actuator produces corresponding movement of the valve member. An overtravel spring is captured in a tensioned condition between the valve member and the shuttle member for maintaining the shuttle member and the valve member in a stationary condition relative to each other within the predetermined range of motion of the valve member and for permitting movement of the shuttle member relative to the valve member sufficient to accommodate movement of the piston of the thermal actuator when the valve member has reached its limit of travel without accommodating the full extent of movement of the piston of the thermal actuator.

6 Claims, 11 Drawing Sheets

U.S. PATENT DOCUMENTS

| | | |
|---|---|---|
| 4,688,273 | 8/1987 | Lyng . |
| 5,011,074 | 4/1991 | Kline . |
| 5,379,936 | 1/1995 | Kline . |
| 5,647,531 | 7/1997 | Kline et al. . |
| 6,085,984 * | 7/2000 | Chamot et al. .................... 236/12.2 |

* cited by examiner

TEMPERATURE-RESPONSIVE MIXING VALVE

TECHNICAL FIELD AND BACKGROUND OF THE INVENTION

This invention relates to a temperature-actuated mixing valve of the general type used to control in-line water temperature in potable hot water systems. Such valves are typically used at the hot water source, such as at a gas or electric hot water heater or boiler. The temperature of the water allowed to flow downstream from the mixing valve is maintained within a predetermined range of temperature by mixing hot and cold water entering the valve on the upstream end. The invention is therefore described with reference to such a hot water system. However, principles of the invention also have application with other liquids and with gases, and for this reason the application is intended to encompass both liquids and gases, and liquids other than water.

Most prior art mixing valves utilize a thermal actuator, which acts as the "motor" of the valve. Such actuators convert thermal energy into mechanical movement. The operating principle of most such devices is based upon the large increase in volume of a thermosensitive material such as wax which, when heated, changes from a solid to a liquid. When such a thermosensitive material is enclosed within a confined space, heating causes the material to expand against a piston to perform work. In some cases such actuators are either provided with two oppositely-acting pistons to increase the range of motion, or two such actuators are placed end-to-end to accomplish the same function. By incorporating a thermal actuator into a mixing valve, hot and cold supply pressures and temperatures can be regulated.

A common problem in the use of such devices is that if the shuttle has moved as far as it can move within the valve, but the piston of the thermal actuator is still trying to move, there must be some means of consuming this extra travel. Otherwise the valve can be damaged or destroyed. This is most often accomplished in the prior art by the use of an overtravel spring mounted around an adjusting bolt in the top of the valve. This solution creates several additional problems. First, this arrangement adds height to the mixing valve, which may prevent or restrict use in confined areas, or promote breakage under impact. Second, the overtravel spring must be preloaded, requiring a means for retaining the spring on the adjusting bolt. Finally, in applications where two thermal actuators are used back-to-back, there must be some way to retain both elements in the shuttle.

In addition, mixing valves are often difficult to disassemble for repair or maintenance, and require the use of tools, often in confined spaces.

The design features of the present invention solve the known prior art problems simply and efficiently.

SUMMARY OF THE INVENTION

Therefore, it is an object of the invention to provide a mixing valve which is compact.

It is another object of the invention to provide a mixing valve which is easy to disassemble.

It is another object of the invention to provide a mixing valve in which the overtravel spring is integral with the shuttle assembly.

It is another object of the invention to provide a mixing valve in which the shuttle cages the thermal element or elements, which permitting unrestricted movement within the full range of movement.

It is another object of the invention to provide a mixing valve wherein the overtravel spring is remote from and operates independently of the adjustment bolt.

These and other objects of the present invention are achieved in the preferred embodiments disclosed below by providing a temperature-actuated mixing valve for controlling outlet temperature in a fluid flow system including a valve housing having first and second fluid supply inlets for introducing first and second respective supply fluids and a fluid outlet for dispensing a fluid at a predetermined outflow temperature. The mixing valve includes a shuttle assembly positioned in the housing. The shuttle assembly comprises a valve member mounted for movement within the housing responsive to the temperature of the supply fluids to vary the mixture ratio of the first and second supply fluids as required to dispense fluid at the predetermined outflow temperature. A shuttle member is positioned within the valve member and is moveable as a unit therewith within a predetermined range of motion responsive to supply fluid temperature variation. A thermal actuator is provided of the type which converts thermal energy into mechanical movement by movement of a piston. A first end of the thermal element engages the movable shuttle member and an opposing second end engages a stationary portion of the housing whereby movement of the piston of the thermal actuator produces corresponding movement of the valve member. An overtravel spring is captured in a tensioned condition between the valve member and the shuttle member for maintaining the shuttle member and the valve member in a stationary condition relative to each other within the predetermined range of motion of the valve member and for permitting movement of the shuttle member relative to the valve member sufficient to accommodate movement of the piston of the thermal actuator when the valve member has reached its limit of travel without accommodating the full extent of movement of the piston of the thermal actuator.

According to one preferred embodiment of the invention, the valve member is generally cylindrical and includes sealing means for sealing the valve member against fluid flow between the valve member and adjacent cylindrical walls of the valve housing.

According to another preferred embodiment of the invention, the shuttle member includes retaining means for retaining the thermal actuator within the shuttle member while permitting movement of the piston responsive to the temperature of the inlet fluids.

According to yet another preferred embodiment of the invention, the retaining means comprises a plurality of elongate fingers axially aligned with the longitudinal axis of the thermal actuator, each of the fingers having a radially inwardly-extending detent for interfering with movement of the thermal actuator beyond a predetermined range of motion for movably-capturing the thermal actuator within the shuttle member.

According to yet another preferred embodiment of the invention, the shuttle member includes an elongate grip pad for permitting the shuttle member to be manually removed from the valve housing without the need for tools.

According to yet another preferred embodiment of the invention, the grip pad extends along the longitudinal axis of the shuttle member.

According to yet another preferred embodiment of the invention, the valve member includes an annular shoulder defining a support for the overtravel spring. The valve member includes locking means for receiving and locking the shuttle member within the valve member. The locking means cooperates with the overtravel spring for tensioning the shuttle member in the stationary condition relative to each other.

According to yet another preferred embodiment of the invention, the locking means comprises a plurality of locking channels formed within the area of the valve member accommodated by the overtravel spring, each of the locking channels having a first segment communicating with an inwardly-facing end of the valve member, a second segment communicating with the first segment and extending peripherally around inner wall of the valve member and a third segment spaced apart from the first segment, communicating with the second segment and terminating at a blind end within the inner walls of the valve member, the plurality of locking channels adapted to receive respective ones of a plurality of locking tabs carried by the shuttle member and lock the shuttle member in the valve member by compressing the overtravel spring and passing the plurality of locking tabs through the first and second segments and to the blind end of the third segment of the locking channels.

According to yet another preferred embodiment of the invention, the shuttle member comprises an elongate stem having an annular bore for receiving the thermal actuator therein for movement therein, retaining means for retaining the thermal actuator in the bore and locking means for locking the stem in the valve member.

According to yet another preferred embodiment of the invention, the valve housing includes an adjusting bolt engaging an end of the thermal actuator remote from the valve member for permitting longitudinal adjustment of the thermal actuator relative to the valve member.

According to yet another preferred embodiment of the invention, the thermal actuator comprises a pair of thermal actuators for increasing the effective range of temperature-responsive motion.

According to yet another preferred embodiment of the invention, the retaining means comprises a cage within which the thermal actuator is captured.

An embodiment of the method according to the invention controls outlet temperature in a fluid flow system including a valve housing having first and second fluid supply inlets for introducing first and second respective supply fluids and a fluid outlet for dispensing a fluid at a predetermined outflow temperature, the mixing valve including a shuttle assembly positioned in the housing. The method comprises the steps of mounting a valve member for movement within the housing responsive to the temperature of the supply fluids to vary the mixture ratio of the first and second supply fluids as required to dispense fluid at the predetermined outflow temperature. A shuttle member is positioned within the valve member as a unit with the valve member within a predetermined range of motion responsive to supply fluid temperature variation and a thermal actuator is provided of the type which converts thermal energy into mechanical energy by movement of a piston wherein a first end of the thermal element engages the movable shuttle member and an opposing second end engages a stationary portion of the housing whereby movement of the piston of the thermal actuator produces corresponding movement of the valve member. The shuttle member and the valve member are maintained in a stationary condition relative to each other within the predetermined range of motion of the valve member while permitting movement of the shuttle member relative to the valve member sufficient to accommodate movement of the piston of the thermal actuator when the valve member has reached its limit of travel without accommodating the full extent of movement of the piston of the thermal actuator.

Another embodiment of the method according to the invention comprises the step of retaining the thermal actuator within a cage forming a part of the shuttle member for permitting movement of the thermal actuator within its range of motion while preventing the thermal actuator from falling out of the shuttle assembly.

According to another preferred embodiment of the invention, a method is disclosed for controlling outlet temperature in a mixing valve of a fluid flow system includes a valve housing having first and second fluid supply inlets for introducing first and second respective supply fluids and a fluid outlet for dispensing a fluid at a predetermined outflow temperature, the mixing valve including a shuttle assembly positioned in the housing and carrying a thermal actuator responsive to the temperature of fluid entering the mixing valve for controlling the ratio of the respective supply fluids to regulate the outflow temperature of the fluid. The method comprises the steps of forming the shuttle assembly from a shuttle member and a valve member releasably-attached together, retaining an overtravel spring between the shuttle member and the valve member, moving the shuttle member and the valve member as a unit responsive to the thermal actuator when regulating the flow of fluid flowing into the mixing valve, and moving the shuttle member relative to the valve member when compensating for overtravel of the thermal actuator.

BRIEF DESCRIPTION OF THE DRAWINGS

Some of the objects of the invention have been set forth above. Other objects and advantages of the invention will appear as the invention proceeds when taken in conjunction with the following drawings, in which.

Figure 1:
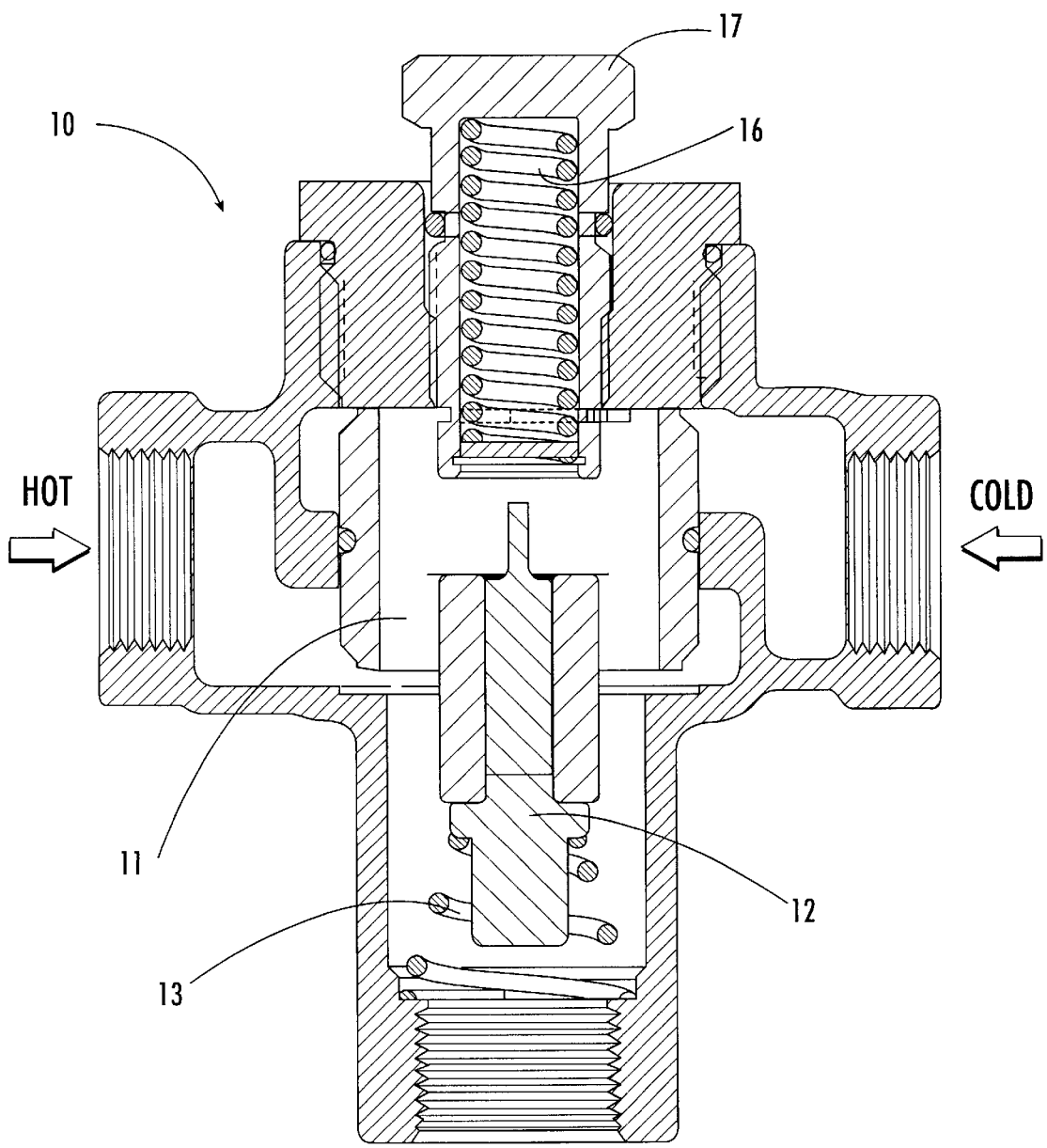
FIG. 1 is a vertical cross-section of a typical prior art temperature-responsive mixing valve.

DESCRIPTION OF THE PREFERRED
EMBODIMENT AND BEST MODE

Referring now specifically to the drawings, a prior art temperature-responsive mixing valve 10 is shown. Note generally that the prior art shuttle assembly 11 is moved by a thermal actuator 12 which is maintained in a tensioned condition by a spring 13, which returns the thermal actuator 12 to its initial position. Another spring 16 captured on the other side of the thermal actuator 12 by an adjustment bolt 17 provides overtravel protection to the shuttle assembly 11. This arrangement results in a valve housing which is relatively large, as is evident from the overall length taken up by the shuttle assembly, spring 13 and spring 16. The shuttle assembly 11 is rigidly attached via a threaded connection to the thermal actuator 12.

Figures 2, 3:
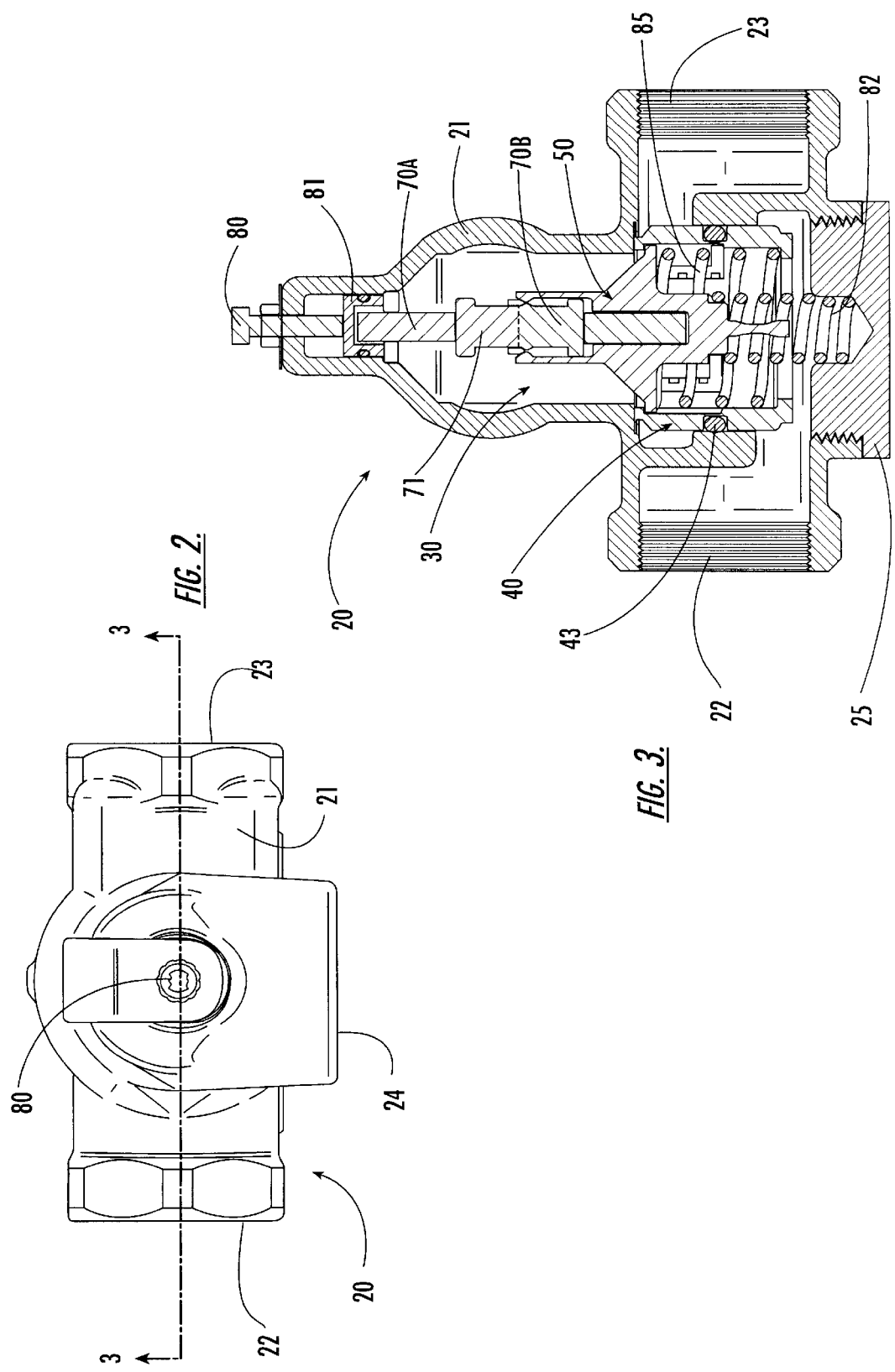
FIG. 2 is a top view of a temperature-responsive mixing valve according to a preferred embodiment of the invention.
FIG. 3 is a vertical cross-section taken substantially along line 3—3 of FIG. 2.

As is shown in FIGS. 2–13, the mixing valve 20 according to a preferred embodiment of the invention is simple, compact, efficient and easy to assemble and disassemble. As is generally shown in FIGS. 2 and 3, mixing valve 20 includes a cast housing 21 which includes a hot water supply inlet 22, and cold supply water inlet 23 and an outlet 24 for discharging a mixture of the hot and cold water downstream. A removable threaded plug 25 positioned in a threaded bore 26 in the housing 21 permits access to the internal parts of the mixing valve 20, as described below.

As is generally shown in FIG. 3, a shuttle assembly 30 is positioned within the mixing valve 20 and regulates the temperature of water flowing from the outlet 24. Shuttle assembly 30 includes an annular, hollow valve member 40 which is releasably locked to a shuttle member 50. The shuttle member 50 carries a pair of thermal actuators 70A, 70B which move the valve member 40 responsive to the temperature of the water flowing into the housing 21 through the inlets 22 and 23. The thermal actuators 70A, 70B are rigidly coupled together, with, for example, a brass collar 71. An adjustment screw 80 is threaded into the top of the housing 21 and is seated against an adjustment plug 81 which also engages the top end of the thermal actuator 70A. The adjustment screw 80 is used to calibrate the adjustment of the valve member 40. A spring 82 is seated in the plug 25 and urges the shuttle member 50 and the thermal actuators 70A, 70B upwardly into engagement with the adjustment plug 81.

An overtravel spring 85 is positioned within the hollow bore of the valve member 40 and cooperates with the shuttle member 50 to accommodate movement of the thermal actuators 70A, 70B beyond the range of the travel of the valve member 40 within housing 21. Further explanation of the operation of the mixing valve 20 follows a more specific description of the shuttle assembly 30.

While the shuttle member 50 and valve member 40 can be fabricated from many suitable materials, which must be moldable or machinable, and dimensionally stable over a wide range of temperatures, one suitable material is a glass-filled plastic such as modified polyphenylene ether ("PTE") such as sold under the trademark "Noryl."

Figure 4:
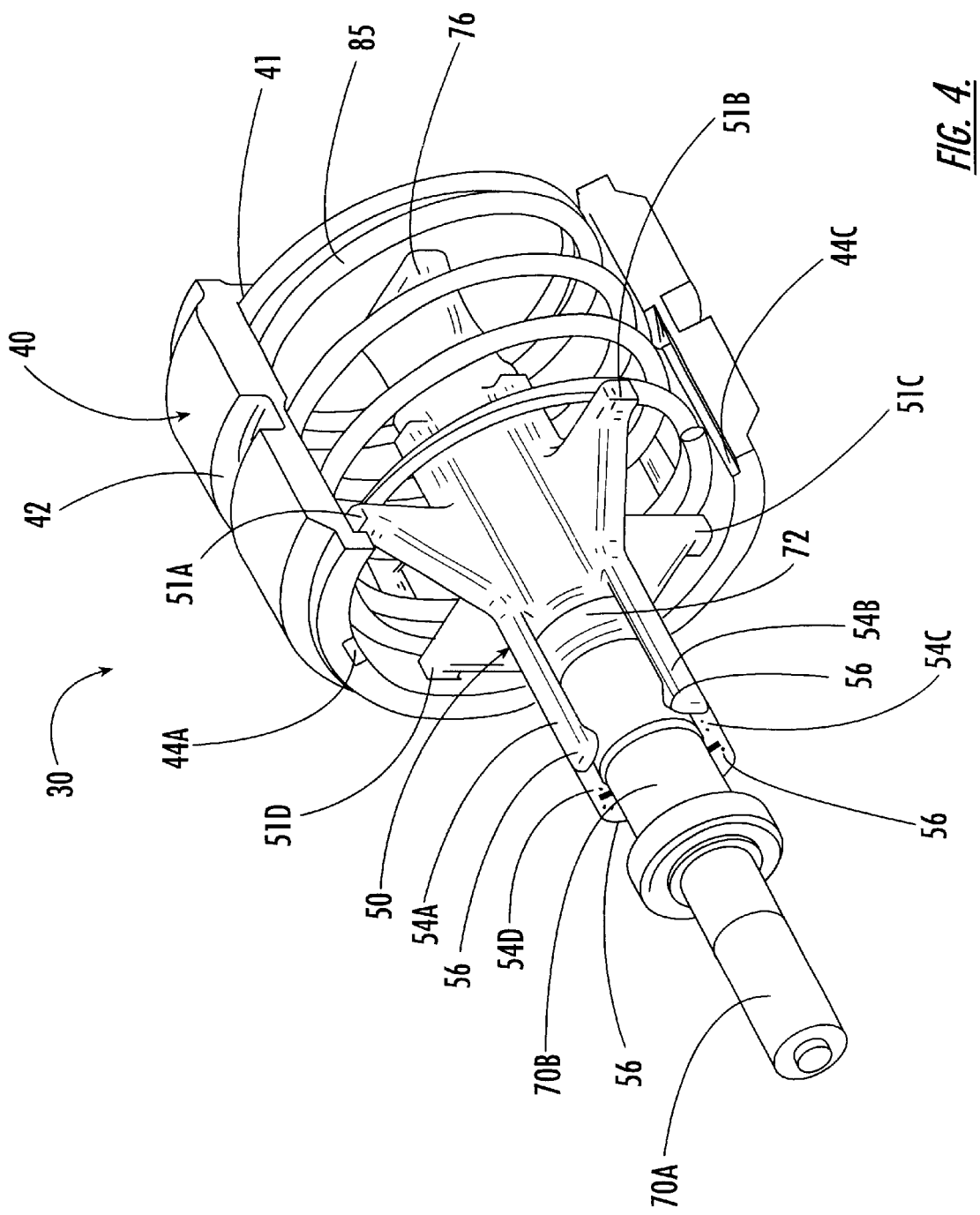
FIG. 4 is a fragmentary perspective view of the shuttle assembly portion of the mixing valve shown in FIGS. 2 and 3.
Figure 5:
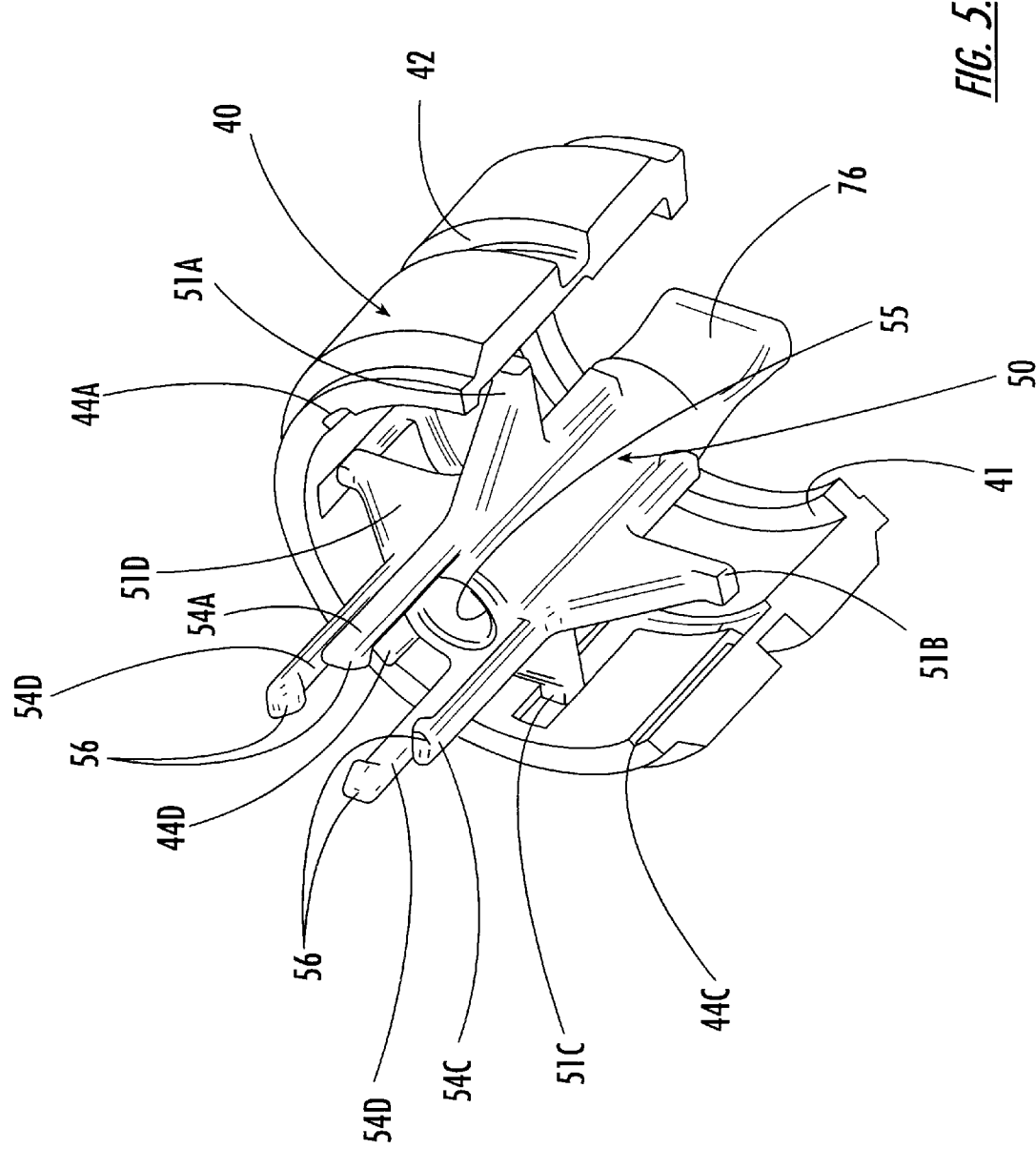
FIG. 5 is a fragmentary perspective view according of the shuttle assembly with the overtravel spring removed to more clearly shown the manner of locking the shuttle member into the valve member.

Referring now to FIGS. 4 and 5, the shuttle assembly 30 is shown in two different views with (FIG. 4) and without (FIG. 5) the thermal actuators 70A, 70B and overtravel spring 85 in place. Valve member 40 includes an interior shoulder 41 on which one end of the overtravel spring 85 rests. An annular groove 42 on the outer surface accommodates an O-ring 43 which seals the valve member 40 against the interior walls of the housing 21. (See FIG. 3). Valve member 40 also includes four three-segment locking channels 44A–D on the interior walls. Each locking channel 44A–D communicates with the top end of the valve member 40 and is adapted to receive one of four integrally-formed locking tabs 51A–D. Each locking channel 44A–D is generally U-shaped and extends along the longitudinal axis of the interior wall of the valve member 40, laterally across the inner periphery of the inner wall of the valve member and then along the longitudinal axis of the interior wall of the valve member 40 to a blind end.

The shuttle member 50 is locked into the valve member 40 by inserting one of the locking tabs 51A–D into a respective one of the locking channels 44A–D. Significant force must be applied to force the locking tabs 51A–D into the locking channels 44A–D against the force of the overtravel spring 85. When the locking tabs 51A–D reach the level of the laterally-extending segment of the locking channels 44A–D the shuttle member 50 is twisted relative to the valve member 40, moving the locking tabs 51A–D along the periphery of the valve member 40 to the respective blind ends of the channels 44A–D. The tension of the overtravel spring 85 securely locks the shuttle member 50 in the valve member 40 while still allowing longitudinal movement of the shuttle member 50 relative to the valve member 40 when necessary to accommodate overtravel of the thermal actuators 70A, 70B. Within the normal range of movement of the valve member 40, the shuttle member 50 and the valve member 40 move together in fixed relation to each other.

Shuttle member 50 also includes four fingers 54A–D which extend along the longitudinal axis of the shuttle member 50 and surround a recess 55 within the thermal actuators 70A, 70B are positioned. Each of the fingers 54A–D have radially inwardly-directed detents 56 which engage and interfere with an enlarged annular ring 72 on the innermost thermal actuator 70B. This prevents the thermal actuator 70B from falling from the shuttle member 50. Rather, a pulling force must be applied to the thermal actuator 70B sufficient to cause the ring 72 to outwardly deform the fingers 54A–D sufficiently to permit the thermal actuator 70B to be removed. In instances where only a single thermal actuator 70B is used, it is captured and held in exactly the same manner.

Finally, the shuttle member 50 also includes an integrally-formed finger grip pad 76 which permits the shuttle member 50 and other attached components to be removed merely by inserting the hand into the housing 21 through the threaded bore 26 after removal of the plug 25. The entire assembly can then be removed from the housing 21.

Figure 6:
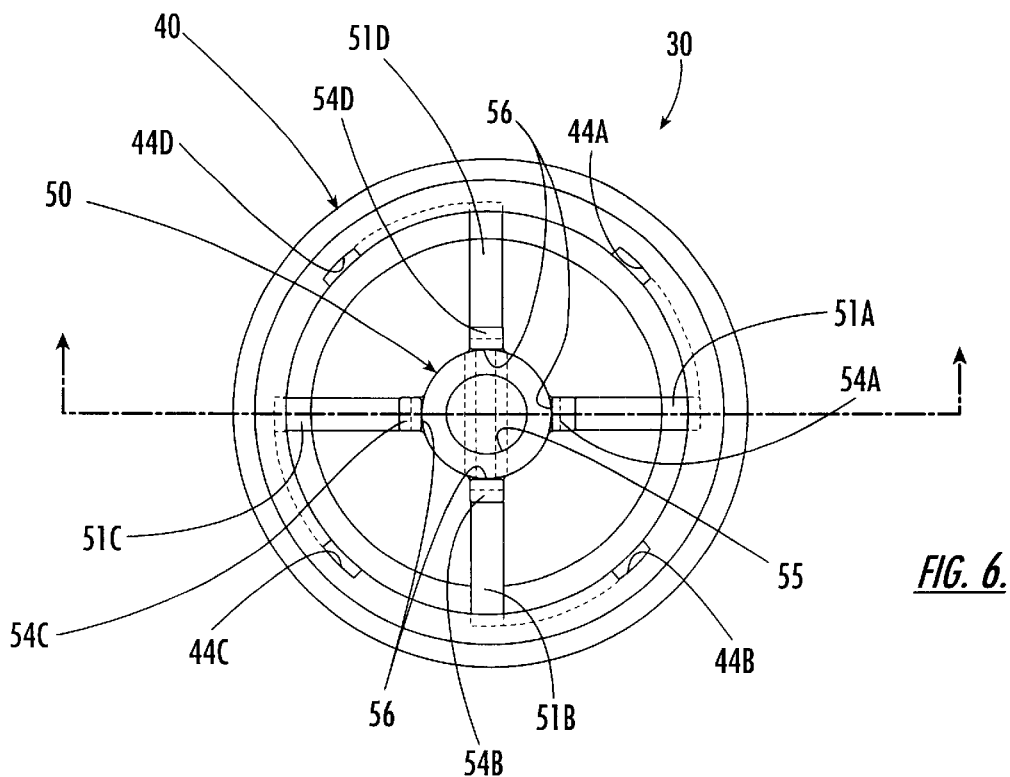
FIG. 6 is a top plan view of the shuttle assembly portion of the mixing valve shown in FIG. 3.
Figure 7:
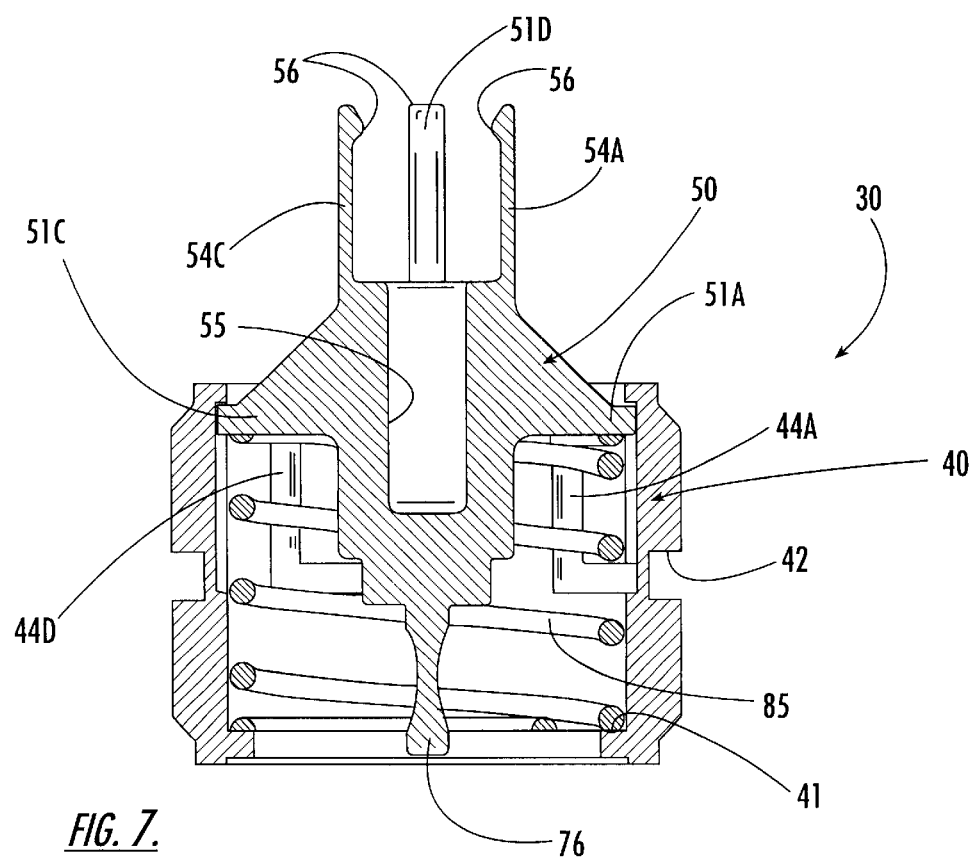
FIG. 7 is a vertical cross-sectional view taken substantially along lines 7—7 of FIG. 6.

FIGS. 6 and 7 further illustrate the arrangement of the locking channels 44A–D, and FIG. 6, in particular, illustrates the laterally-extending channel segment which extends around the inner periphery of the valve member 40. Note also in FIG. 7 that the overtravel spring 85 is captured in a compressed condition between the bottom side of the locking tabs 51A–D and the shoulder 41 on the opposite end of the valve member 40.

Figure 8:
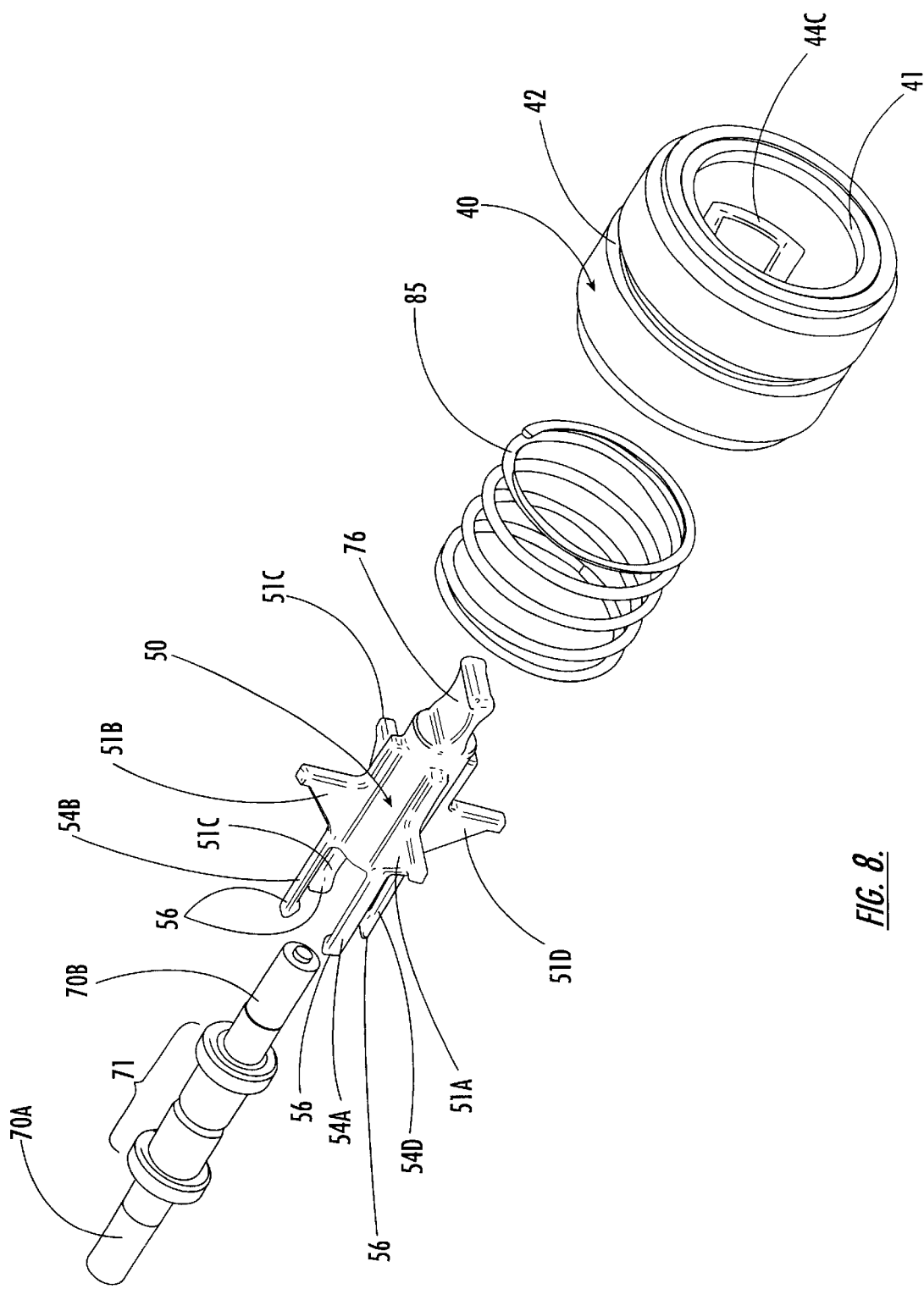
FIG. 8 is an exploded perspective view of the shuttle assembly portion of the mixing valve shown in FIG. 3.

The overall assembly of the shuttle assembly 30 is shown in FIG. 8. Each of the elements, namely, the valve member 40, the shuttle member 50, the overtravel spring 85 and the thermal actuators 70A, 70B have a common central axis and thus a symmetrical longitudinal orientation.

Figure 9:
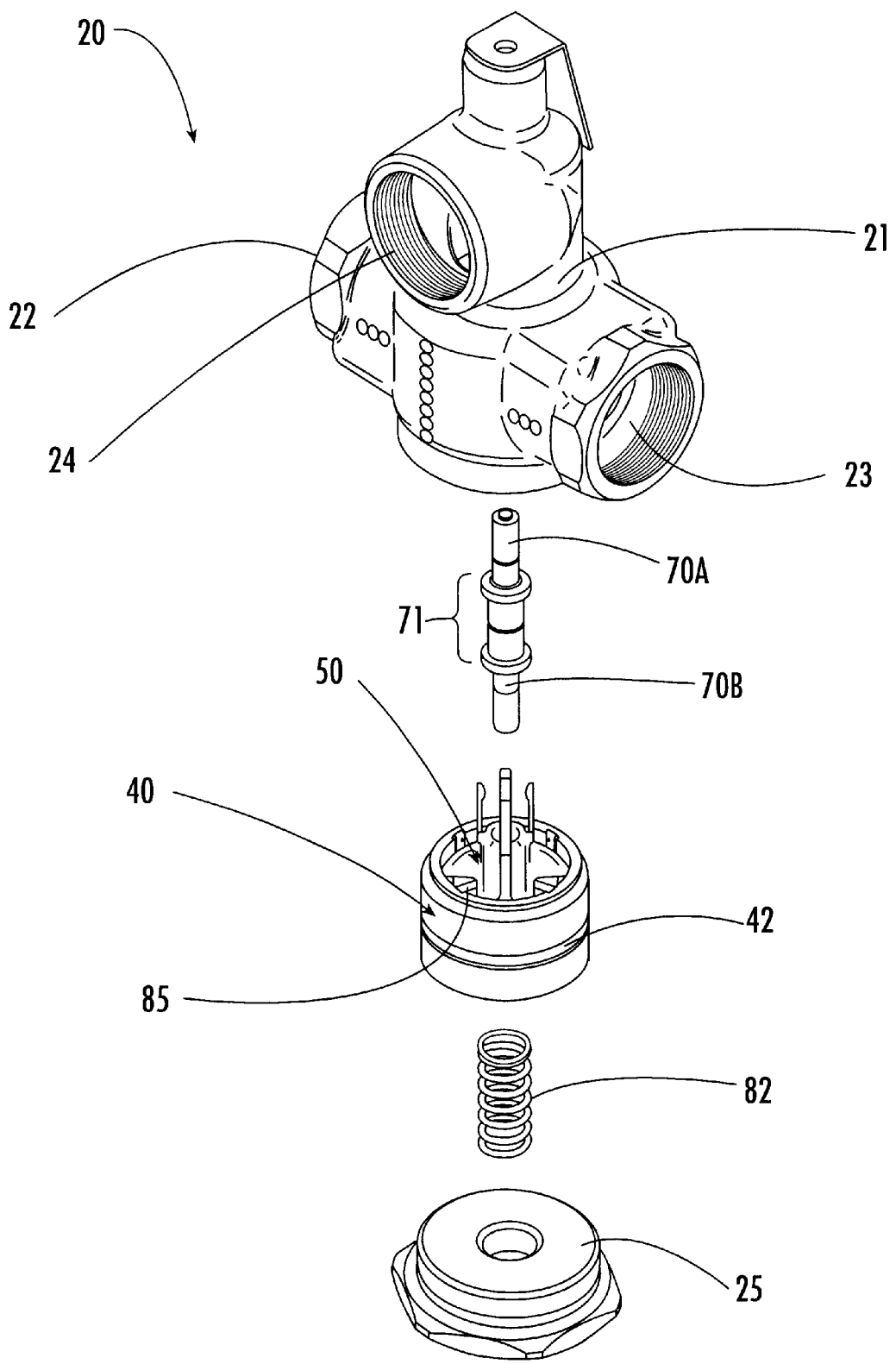
FIG. 9 is an exploded view of a temperature-responsive mixing valve including a shuttle assembly according to one embodiment of the invention.

The incorporation of the shuttle assembly 30 into the mixing valve 20 is shown in FIG. 9. The plug 25 captures the shuttle assembly 30 and the spring 82 in the housing 21. The mixing valve is then ready to install in a water system by connecting suitable inlet and outlet piping to the inlets 22, 23 and the outlet 24, respectively.

Figure 10:
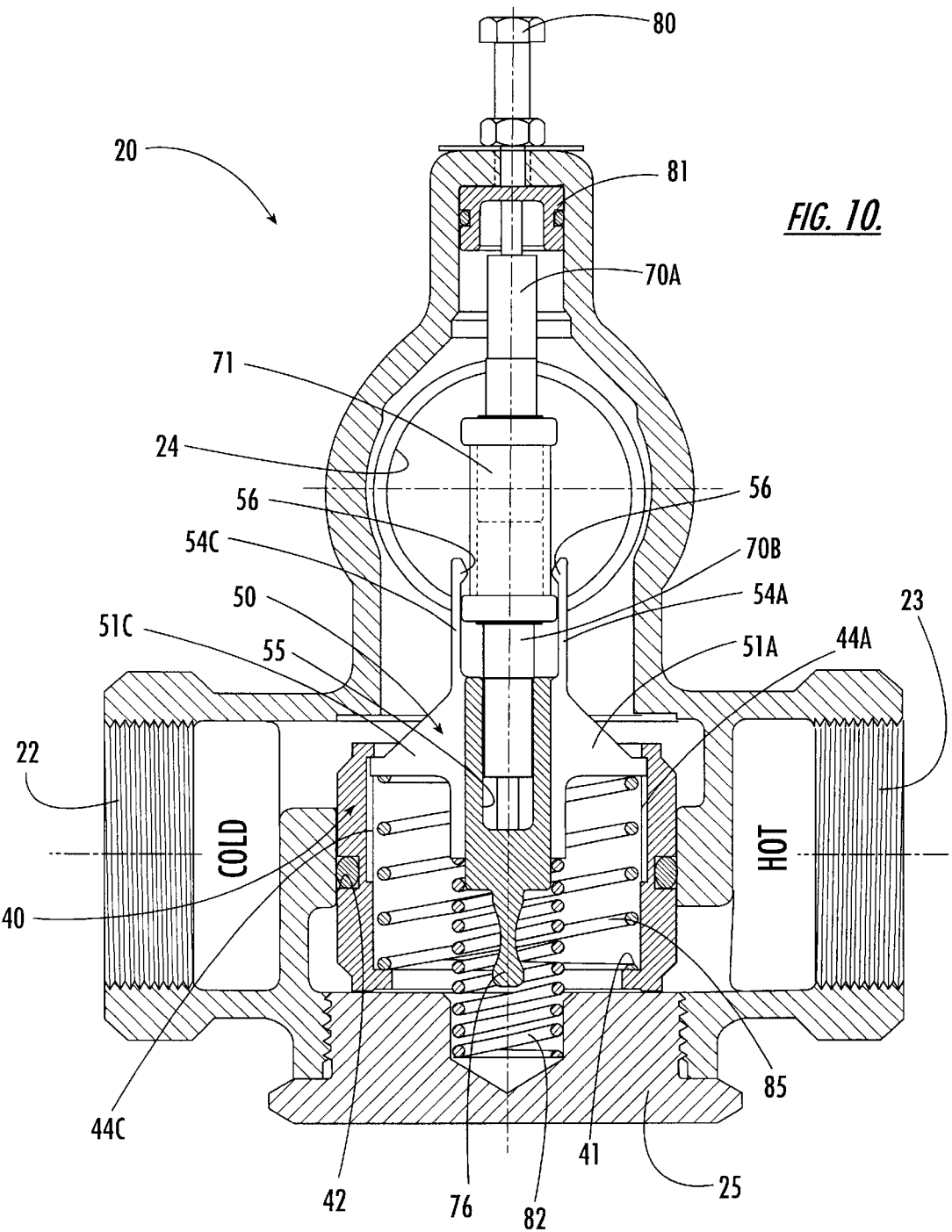
FIGS. 10–13 are vertical cross-sections of the mixing valve generally as shown in FIG. 9 in various temperature-responsive flow positions.
Figure 11:
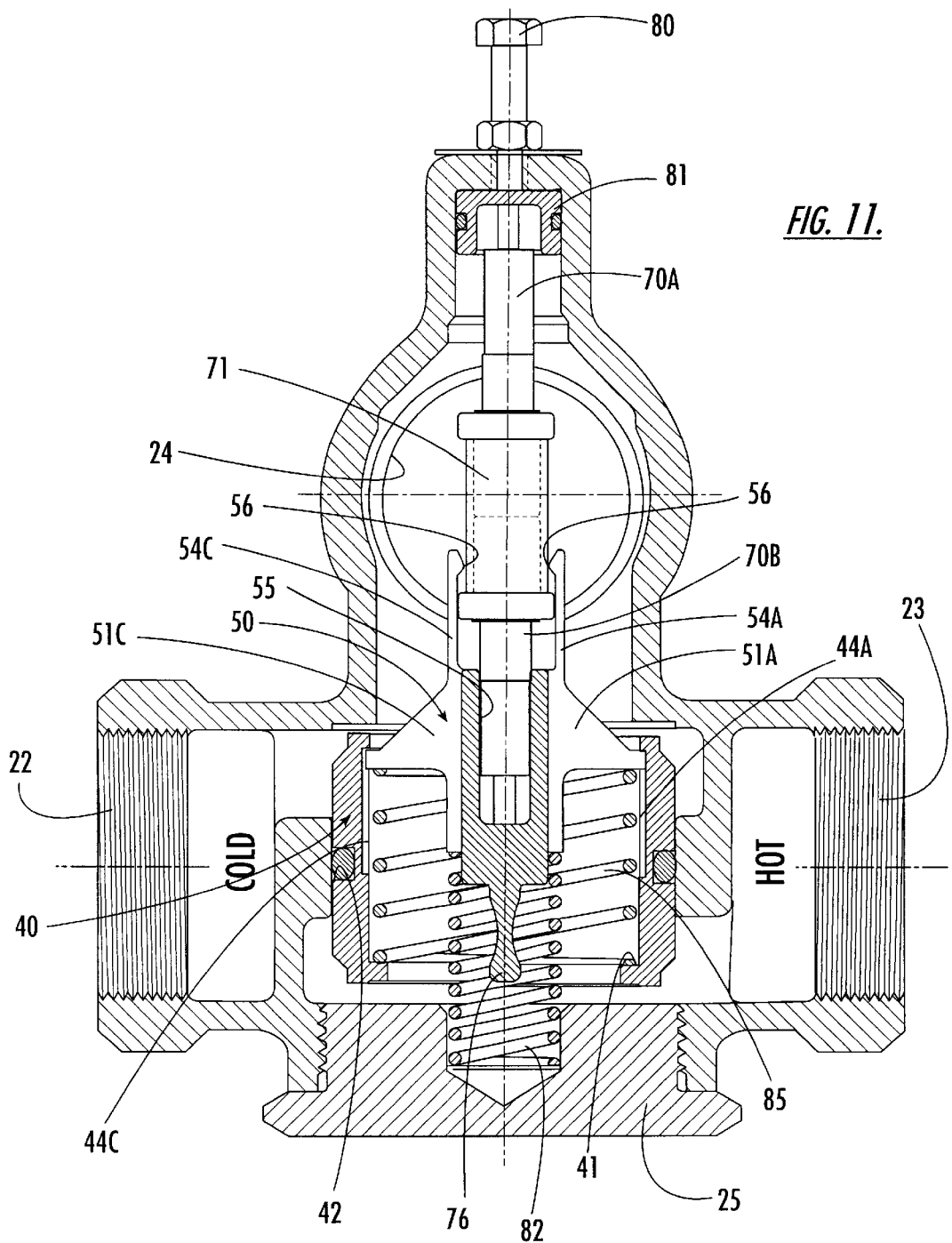

Operation of the mixing valve 20 is illustrated in FIGS. 10–13. The mixing valve 20 is set to produce a mixed outflow of water within a predetermined temperature range, taking into account the nominal temperature of the cold and hot water flowing into the valve 20. FIG. 10 illustrates the valve member position when only cold water is being supplied to the valve 20. This occurs transiently as necessary when too much hot water flow has heated the thermal actuators to the point where the temperature of the outlet flow is outside of limits, and when a long period of time with little or no flow has heated the valve 20 significantly.

If set correctly, the mixture of hot water and cold water through the mixing valve 20 results in an outflow which is within the desired temperature range. Thus, in FIG. 11 both hot water and cold water flow past the valve member 40. As shown, movement of the valve member 40 simultaneously increases the flow of hot water when the flow of cold water is being decreased, and vice versa. The movement of the valve member 40 acts as a form of servo-feedback device to constantly sense and correct imbalances in the inflow temperature of the water.

Figure 12:
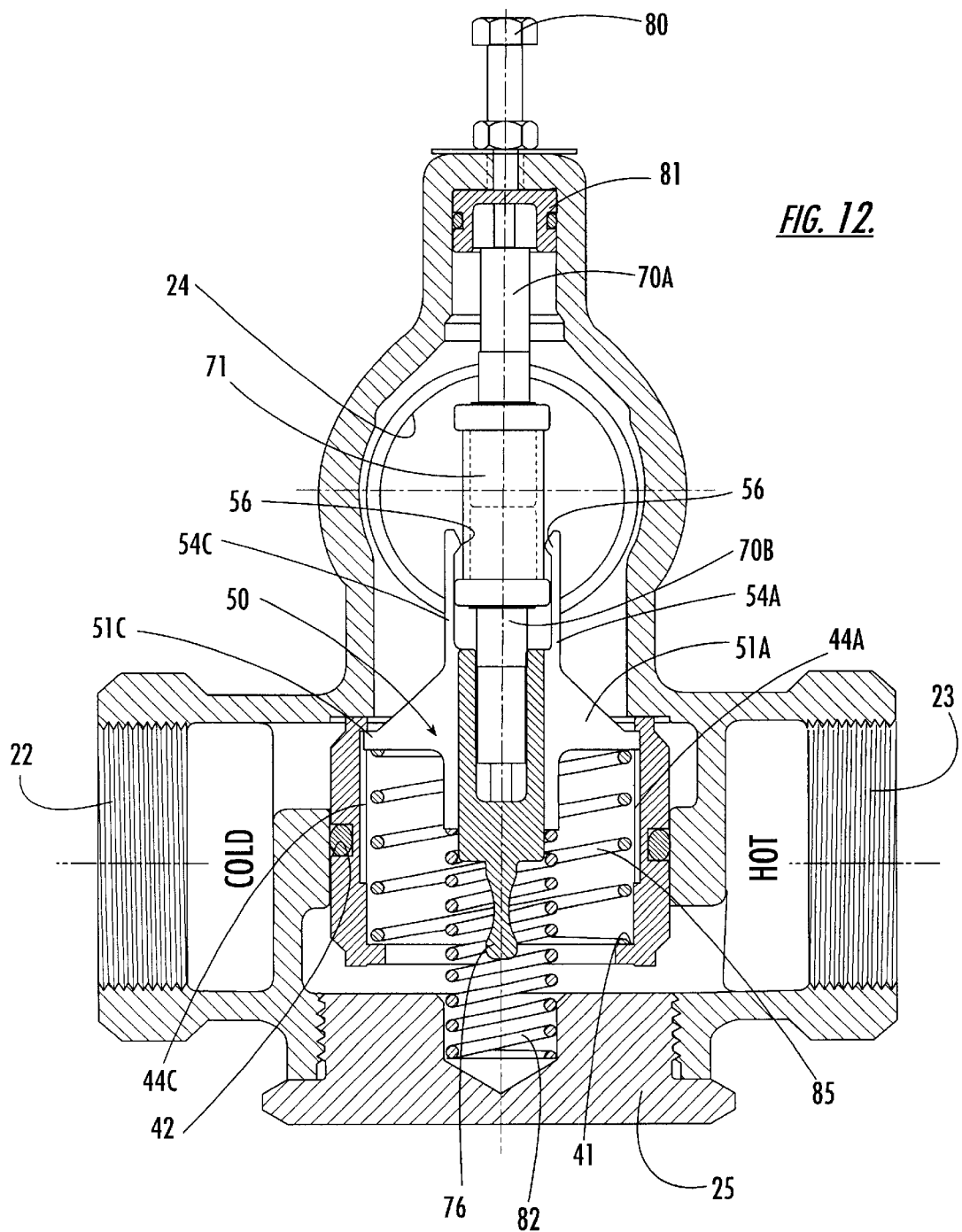

FIG. 12 illustrates the condition when only hot water is being passed into the mixing valve 20 in order to compensate for a temperature which is below the lower temperature range. The valve member 40 is thus at the top of its movement range.

Figure 13:
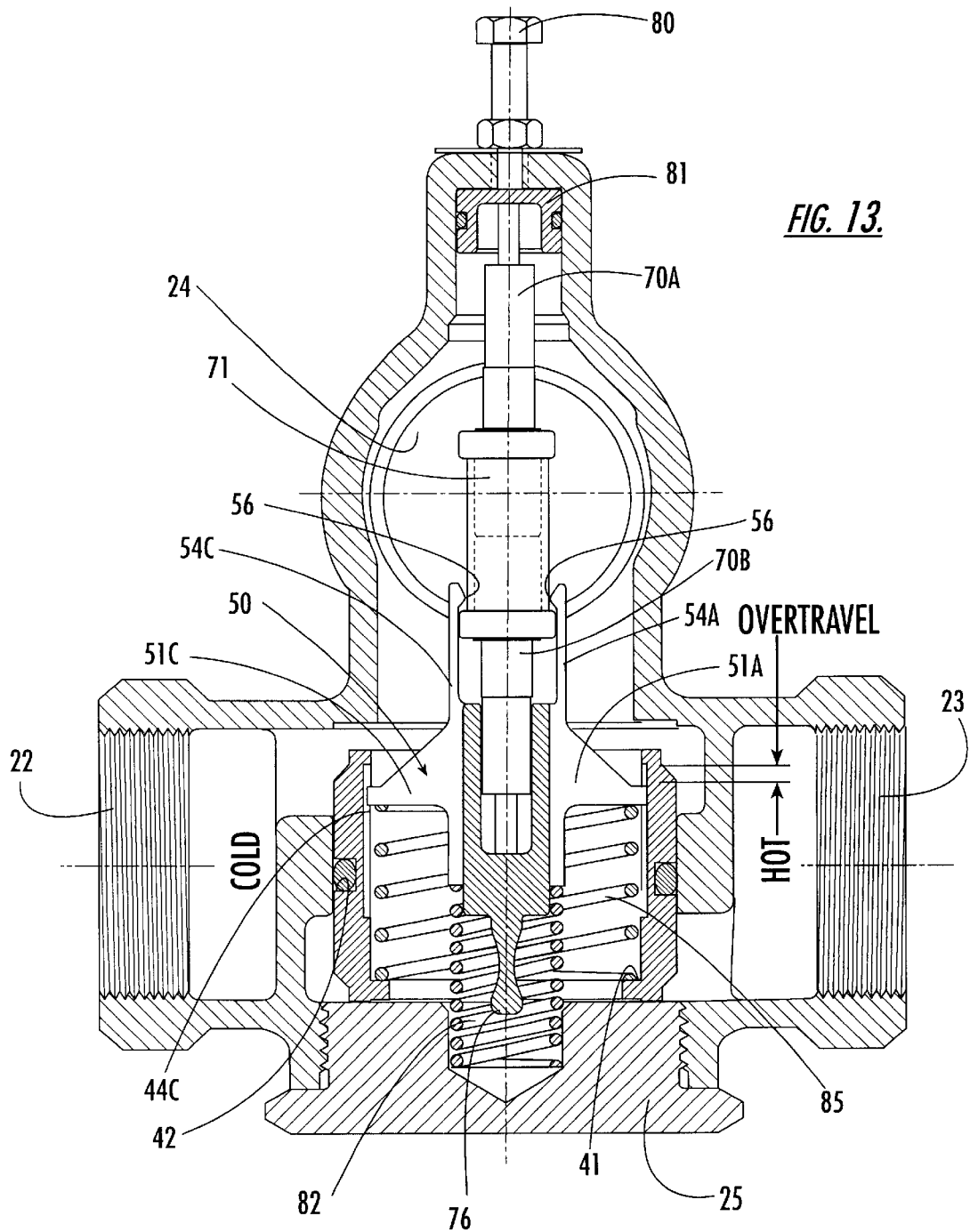

FIG. 13 illustrates the situation when a temperature imbalance on the hot side has called for cold water, but the temperature imbalance is such that the thermal actuators 70A, 70B has caused the valve member 40 to bottom out on the plug 25 at the bottom of the mixing valve 20, but is still expanding. In this case, the overtravel spring 85 is compressed by the further downward force by the shuttle member 50, preventing damage to the valve 20. Correction of the overtravel condition immediately returns the mixing valve 20 to normal operation.

A temperature-actuated mixing valve is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A temperature-actuated mixing valve for controlling outlet temperature in a fluid flow system including a valve housing having first and second fluid supply inlets for introducing first and second respective supply fluids and a fluid outlet for dispensing a fluid at a predetermined outflow temperature, said mixing valve including
a shuttle assembly positioned in said housing, said shuttle assembly comprising:
(a) a valve member mounted for movement within said housing responsive to the temperature of the supply fluids to vary the mixture ratio of the first and second supply fluids as required to dispense fluid at the predetermined outflow temperature;
(b) a shuttle member positioned within said valve member and moveable as a unit therewith within a predetermined range of motion responsive to supply fluid temperature variation;
(c) a thermal actuator of the type which converts thermal energy into mechanical movement by movement of a piston, a first end of said thermal element engaging said movable shuttle member and an opposing second end engaging a stationary portion of said housing whereby movement of the piston of the thermal actuator produces corresponding movement of the valve member;
(d) retaining means carried on said shuttle member for retaining said thermal actuator within the shuttle member while permitting movement of the piston responsive to the temperature of the inlet fluids, said retaining means comprising a plurality of elongate fingers axially aligned with the longitudinal axis of the thermal actuator, each of said fingers having a radially inwardly-extending detent for interfering with movement of the thermal actuator beyond a predetermined range of motion for movably-capturing the thermal actuator within the shuttle member; and
(e) an overtravel spring captured in a compressed condition between said valve member and the shuttle member for maintaining the shuttle member and the valve member in a stationary condition relative to each other within the predetermined range of motion of the valve member and for permitting movement of the shuttle member relative to the valve member sufficient to accommodate movement of the piston of the thermal actuator when the valve member has reached its limit of travel without accommodating the full extent of movement of the piston of the thermal actuator.

2. A temperature-actuated mixing valve for controlling outlet temperature in a fluid flow system including a valve housing having first and second fluid supply inlets for introducing first and second respective supply fluids and a fluid outlet for dispensing a fluid at a predetermined outflow temperature, said mixing valve including
a shuttle assembly positioned in said housing, said shuttle assembly comprising:
(a) a valve member mounted for movement within said housing responsive to the temperature of the supply fluids to vary the mixture ratio of the first and second supply fluids as required to dispense fluid at the predetermined outflow temperature;
(b) a shuttle member positioned within said valve member and moveable as a unit therewith within a predetermined range of motion responsive to supply fluid temperature variation, said shuttle member including an elongate grip pad for permitting the shuttle member to be manually removed from said valve housing without the need for tools;
(c) a thermal actuator of the type which converts thermal energy into mechanical movement by movement of a piston, a first end of said thermal element engaging said movable shuttle member and an opposing second end engaging a stationary portion of said housing whereby movement of the piston of the thermal actuator produces corresponding movement of the valve member;
(d) retaining means carried on said shuttle member for retaining said thermal actuator within the shuttle member while permitting movement of the piston responsive to the temperature of the inlet fluids; and
(e) an overtravel spring captured in a compressed condition between said valve member and the shuttle member for maintaining the shuttle member and the valve member in a stationary condition relative to each other within the predetermined range of motion of the valve member and for permitting movement of the shuttle member relative to the valve member sufficient to accommodate movement of the piston of the thermal actuator when the valve member has reached its limit of travel without accommodating the full extent of movement of the piston of the thermal actuator.

3. A temperature-actuated mixing valve according to claim 1, wherein said grip pad extends along the longitudinal axis of the shuttle member.

4. A temperature-actuated mixing valve for controlling outlet temperature in a fluid flow system including a valve housing having first and second fluid supply inlets for introducing first and second respective supply fluids and a fluid outlet for dispensing a fluid at a predetermined outflow temperature, said mixing valve including a shuttle assembly positioned in said housing, said shuttle assembly comprising:
  (a) a valve member mounted for movement within said housing responsive to the temperature of the supply fluids to vary the mixture ratio of the first and second supply fluids as required to dispense fluid at the predetermined outflow temperature;
  (b) a shuttle member positioned within said valve member and moveable as a unit therewith within a predetermined range of motion responsive to supply fluid temperature variation;
  (c) a thermal actuator of the type which converts thermal energy into mechanical movement by movement of a piston, a first end of said thermal element engaging said movable shuttle member and an opposing second end engaging a stationary portion of said housing whereby movement of the piston of the thermal actuator produces corresponding movement of the valve member;
  (d) retaining means carried on said shuttle member for retaining said thermal actuator within the shuttle member while permitting movement of the piston responsive to the temperature of the inlet fluids; and
  (e) an overtravel spring captured in a compressed condition between said valve member and the shuttle member for maintaining the shuttle member and the valve member in a stationary condition relative to each other within the predetermined range of motion of the valve member and for permitting movement of the shuttle member relative to the valve member sufficient to accommodate movement of the piston of the thermal actuator when the valve member has reached its limit of travel without accommodating the full extent of movement of the piston of the thermal actuator, said valve member including an annular shoulder defining a support for said overtravel spring and a locking means for receiving and locking the shuttle member within the valve member, said locking means cooperating with said overtravel spring for tensioning the shuttle member in the stationary condition relative to each other.

5. A temperature-actuated mixing valve according to claim 4, wherein said locking means comprises a plurality of locking channels formed within the area of the valve member accommodated by the overtravel spring, each of said locking channels having a first segment communicating with an inwardly-facing end of the valve member, a second segment communicating with the first segment and extending peripherally around inner walls of the valve member and a third segment spaced apart from said first segment, communicating with said second segment and terminating at a blind end within the inner walls of the valve member, said plurality of locking channels adapted to receive respective ones of a plurality of locking tabs carried by said shuttle member and lock the shuttle member in the valve member by compressing the overtravel spring and passing the plurality of locking tabs through the first and second segments and to the blind end of the third segment of the locking channels.

6. A temperature-actuated mixing valve for controlling outlet temperature in a fluid flow system including a valve housing having first and second fluid supply inlets for introducing first and second respective supply fluids and a fluid outlet for dispensing a fluid at a predetermined outflow temperature, said mixing valve including a shuttle assembly positioned in said housing, said shuttle assembly comprising:
  (a) a valve member mounted for movement within said housing responsive to the temperature of the supply fluids to vary the mixture ratio of the first and second supply fluids as required to dispense fluid at the predetermined outflow temperature;
  (b) a shuttle member positioned within said valve member and moveable as a unit therewith within a predetermined range of motion responsive to supply fluid temperature variation, said shuttle member comprising an elongate stem having an annular bore for receiving a thermal actuator therein for movement therein, said thermal actuator of the type which converts thermal energy into mechanical movement by movement of a piston, a first end of said thermal element engaging said movable shuttle member and an opposing second end engaging a stationary portion of said housing whereby movement of the piston of the thermal actuator produces corresponding movement of the valve member;
  (c) retaining means carried on said shuttle member for retaining said thermal actuator in said bore while permitting movement of the piston responsive to the temperature of the inlet fluids;
  (d) locking means for locking said stem in said valve member; and
  (e) an overtravel spring captured in a compressed condition between said valve member and the shuttle member for maintaining the shuttle member and the valve member in a stationary condition relative to each other within the predetermined range of motion of the valve member and for permitting movement of the shuttle member relative to the valve member sufficient to accommodate movement of the piston of the thermal actuator when the valve member has reached its limit of travel without accommodating the full extent of movement of the piston of the thermal actuator.

* * * * *